United States Patent Office.

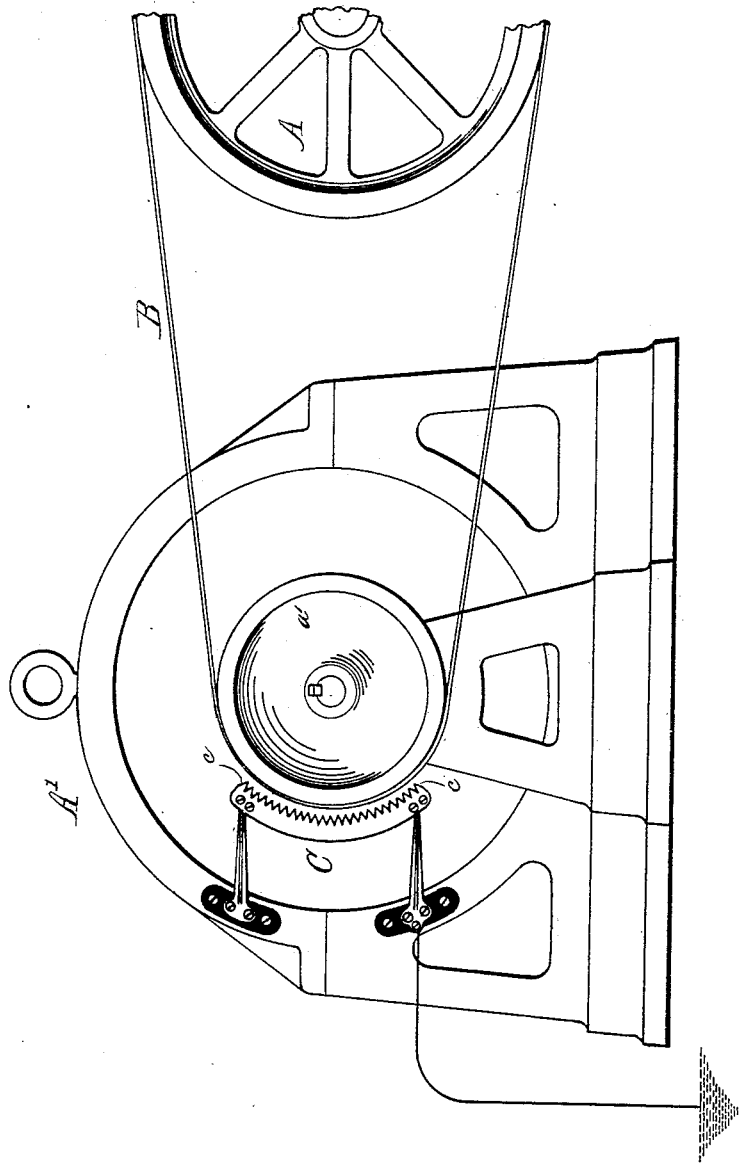

REGINALD BELFIELD, OF PITTSBURG, PENNSYLVANIA, ASSIGNOR TO THE WESTINGHOUSE ELECTRIC COMPANY, OF SAME PLACE.

ELECTRIC DISCHARGE DEVICE.

SPECIFICATION forming part of Letters Patent No. 392,400, dated November 6, 1888.

Application filed July 20, 1888. Serial No. 280,467. (No model.)

*To all whom it may concern:*

Be it known that I, REGINALD BELFIELD, a subject of the Queen of Great Britain, residing in Pittsburg, in the county of Allegheny and State of Pennsylvania, have invented certain new and useful Improvements in Electric Discharge Devices for Electric Generators, (Case No. 214,) of which the following is a specification.

The invention relates to the class of devices employed for securing a silent and harmless discharge of electric currents of very high tension.

In operating dynamo-electric generators, especially those employed for producing alternating electric currents of very high potential, it is found that the friction between the belt and the belt-wheels of the generator and the driving-engine excite charges of electricity of very high potential. The tendency of one polarity is to seek the earth through the generator, and thus return to the opposite polarity by way of the driving-engine. The armature of the generator is necessarily connected with conductors extending over a vast area, and the discharge frequently takes place through the insulation of the armature to the wires, thus escaping throughout the system. Very high insulation of mica and other insulating substances are thus pierced and destroyed by the discharges. The purpose of the present invention is to provide means whereby the electricity which is thus caused to charge the driving-pulley may escape independently of the armature, and thus avoid injury thereto.

The invention consists in equipping the generator with discharge-points which are supported by but insulated from the frame of the generator and directed toward the belt-wheel. These points are connected electrically with the earth. A harmless discharge may take place at all times from the pulley to the points, and thus to the earth or to the driving-engine.

In the accompanying drawing there is shown an alternate-current electric generator equipped with the discharge device in connection with the driving-engine.

Referring to the figure, A represents the belt-wheel of a suitable steam-engine for driving the generator A'. The belt-wheel is connected by means of the belt B with the driving-pulley or belt-wheel $a'$ of the generator. There is secured to the generator or supported therefrom a plate, C, provided with discharge-points $c$, which extend toward the edge of the pulley or belt-wheel $a'$. This plate is insulated from the generator, but electrically connected with the earth or with the engine A. The discharge-plate may be located between the belt-wheel and the armature of the generator, so that it is entirely out of the way. Other general forms of discharge-points may be employed, and their shapes may be varied.

It will be understood that I do not broadly claim the use of discharge-points for protecting apparatus from electric currents of high potential, but only in connection with an electric generator wherein the electricity is generated by the action of driving the generator in such relation thereto as to endanger the insulation of the armature.

I claim as my invention—

1. The combination, with a driving-engine, of an electric generator, a belt connecting the generator with the engine, and discharge-points carried by the generator and directed toward the pulley or belt-wheel of the generator and in electrical connection with the engine.

2. The combination, with an alternate-current electric generator, of discharge-points carried thereby but insulated therefrom and directed toward the belt-wheel of the generator.

In testimony whereof I have hereunto subscribed my name this 30th day of June, A. D. 1888.

REGINALD BELFIELD.

Witnesses:
CARRIE E. DAVIDSON,
CHARLES A. TERRY.